United States Patent [19]

Uhlemayr et al.

[11] 4,383,860
[45] May 17, 1983

[54] PAPER PRINTING INK AND ITS USE

[75] Inventors: Albert Uhlemayr, Haag; Heinrich Traitteur, Munich, both of Fed. Rep. of Germany

[73] Assignee: Michael Huber München GmbH, Kirchheim-Heimstetten, Fed. Rep. of Germany

[21] Appl. No.: 274,311

[22] Filed: Jun. 16, 1981

[30] Foreign Application Priority Data

Jun. 20, 1980 [DE] Fed. Rep. of Germany ....... 3023118

[51] Int. Cl.³ ............... C09D 11/06; C09D 11/08; C09D 11/10
[52] U.S. Cl. ............... 106/27; 101/154; 101/426; 106/28; 106/29; 260/DIG. 38
[58] Field of Search ........... 260/DIG. 38, 22 TN, 260/22 R, 26; 106/27, 28, 29; 101/426, 154

[56] References Cited

U.S. PATENT DOCUMENTS

| | | | |
|---|---|---|---|
| 2,299,547 | 10/1942 | Letteron | 106/27 |
| 3,196,786 | 7/1965 | Hornberger et al. | 101/154 |
| 3,481,891 | 12/1969 | Boylan et al. | 106/27 |
| 3,685,442 | 8/1972 | Harwell | 101/154 |
| 3,688,695 | 9/1972 | James | 101/426 |
| 3,728,298 | 4/1973 | Hartmann | 260/DIG. 38 |
| 3,786,008 | 1/1974 | Piiroya et al. | 106/28 |
| 4,148,767 | 4/1979 | Spicer et al. | 260/DIG. 28 |
| 4,231,906 | 11/1980 | Giorgetti | 106/28 |
| 4,233,195 | 11/1980 | Mills | 106/27 |
| 4,248,746 | 2/1981 | Greiner | 101/426 |

FOREIGN PATENT DOCUMENTS

| | | | |
|---|---|---|---|
| 170017 | 6/1951 | Austria | 106/27 |
| 50-73710 | 6/1975 | Japan | 260/DIG. 38 |
| 699513 | 11/1951 | United Kingdom | 260/DIG. 38 |

OTHER PUBLICATIONS

Chemical Abstracts, vol. 83, No. 24, Dec. 15, 1975, p. 137, Abstract No. 83:195457y.

*Primary Examiner*—Ronald W. Griffin
*Attorney, Agent, or Firm*—Toren, McGeady and Stanger

[57] ABSTRACT

A paper printing ink is disclosed composed of a pigment, an alkyd resin binder modified with a long-chain fatty acid and which optionally contains conventional components, such as, lubricants, solvents, and viscosity modifiers, wherein the alkyd resin is a non-drying resin modified with oils, fatty acids, or fatty alcohols having an iodine number less than about 20. The inks of the present invention possess good printability properties and pigment wetting capability. This results in high gloss abrasion-resistant printing films which are free from contact yellowing and odor formation. Moreover, the inks of the present invention can be readily removed from the paper, thereby facilitating recycling of the paper. Methods for utilizing the inks as well as products printed with the inks are disclosed.

14 Claims, No Drawings

PAPER PRINTING INK AND ITS USE

BACKGROUND OF THE INVENTION

1. Field of the Invention

The invention relates to the field of printing inks for paper for graphic purposes consisting of pigment, an alkyd resin modified with long-chain fatty acids and, optionally, conventional additives, such as, lubricants, solvents, and viscosity modifiers. Moreover, the invention relates to the use of these printing inks.

2. Description of the Prior Art

Modern printing inks for printing paper must meet a large number of requirements which are dependent on the particular final application and often appear to be contradictory.

For example, paper printing inks for holding boxes should have an abrasion resistance as high as possible. On the other hand, it should be possible to readily remove these printing inks, for example, from newspapers, bulk printing matter, etc., so that these products can be processed as used paper and recycled.

A further requirement is that printing inks used in the manufacture of packaging materials for foodstuffs, luxury foods and cosmetics, such as, coffee, alcohol, tobacco, or chocolate wrappers, must have an extremely neutral odor and taste. In the area of printed labels glued onto reusable bottles, it is necessary that the printed labels have a high rate of penetration for suds, so that cleaning liquors are able to rapidly penetrate the two-dimensional film of printing ink on the label and remove it easily.

From a production point of view also, printing inks and their components must fulfill a number of requirements. For instance, it is necessary to ensure good wetting of the pigments by choosing appropriate binder compositions, by special additives, or by pretreating the pigments. However, the pigment wettability should not be achieved at the expense of the printing quality. Moreover, the composition of a printing ink should be such, that it has as high a pigment absorption capacity as possible, without disadvantageously impairing the adhesion of the printing.

These complex application and manufacturing requirements are the cause for the numerous attempts to find an acceptable compromise, see, for example, British Pat. No. 699,513, U.S. Pat. Nos. 3,481,891 and 3,786,008.

Besides pigments, the usual printing inks for paper contain binders and additives, which aid the processability. The binders regularly comprise a resin mixture of drying alkyd resins, for example, vegetable oils, such as, linseed oil, soybean oil, tung oil, including dryers, such as, cobalt naphthenate and manganese octoate, as well as hard resins, such as, phenol-modified rosin derivatives, hydrocarbon resins and others. Moreover, the usual printing inks contain considerable amounts of mineral oils in the range of 25 to 40 weight percent.

The oxidatively cross-linking alkyds have the particular task of aiding the wetting of the pigments. Usually for this purpose, phthalate resins (ortho-, iso-, and terephthalate esters) and/or urethane-containing alkyd resins are used. They are composed of dicarboxylic acids and multifunctional alcohols, such as, glycerine, pentaerythritol, sorbitol, trimethylolpropane, or of multifunctional isocyanates on the one hand and oils, natural or synthetic fatty acids or fatty alcohols on the other. These materials are produced by conventional methods.

Because of their better pigment absorption capability, alkyds of low viscosity are generally preferred insofar as their use is permitted by the consistency of the finished printing ink.

For the preparation of the printing ink, various resins are dissolved at elevated temperatures in mineral oil and the pigment is then added. The printing ink film, produced with such conventional printing inks, then cures oxidatively.

The properties of such printing inks and the printings produced with them have not been entirely satisfactory. Improvements in the printability properties are needed. Moreover, in previously known printing inks, contact yellowing and odor formation interfere with the printed products. The increasing desire to recycle used paper has now posed an additional special problem resulting from the use of these prior art printing inks. This can be observed by comparing the degree of whiteness of printed and unprinted paper, and especially of imitation art paper.

SUMMARY OF THE INVENTION

We have discovered a paper printing ink which is free of the above disadvantages of the previously known printing inks and the printed products produced with these inks. In particular, the ink of the present invention, possesses good printability properties and pigment wetting capability which leads to high gloss, abrasion-resistant printing films, free from contact yellowing and odor formation and which can readily be removed from the paper.

More particularly, the printing ink of the present invention is composed of a pigment, an alkyd resin binder modified with long-chain fatty acids and, optionally, additional conventional components, such as, lubricants, solvents and a viscosity modifier, in which the alkyd resin is a non-drying alkyd resin, prepared using oils, fatty acids and/or fatty alcohols with an iodine number less than 20.

The printing ink of the present invention may be used in lithoprinting, relief painting, or rotogravure.

DESCRIPTION OF THE PREFERRED EMBODIMENT

Baking enamels for metallic substrates and the like are known which contain thermosetting resins, such as, melamine resin or aminotriazine-aldehyde resins and non-drying alkyd resins, modified with practically saturated oils or fatty acids. See Japanese Laid-Open Application No. 50 737 10 and Austrian Pat. No. 170,017. The main emphasis in these patents is the production of a three-dimensional baking enamel which is crosslinked with the melamine- or aminotriazine-aldehyde resin and which adheres firmly and is bonded irreversibly to the sheet metal. However, this is obviously quite different from the purpose of printing inks for use on paper and the problems in such technology are often completely different to those encountered in paper processing.

In the present invention, the customary alkyd resins can be used, for example, the aforementioned phthalate resins, glyptals or even urethane-alkyd resins, provided that they are modified with oils, fatty acids and/or fatty alcohols or mixtures of such materials with the above-mentioned iodine number. As oil, for example, coconut oil (iodine number of approximately 9) and palm kernel oil (iodine number of 10 to 18) are suitable. Iodine numbers of approximately 10 or less are especially preferred. Instead of or in addition to oils, the alkyd resins may be modified with fatty acids, including synthetic fatty acids and/or fatty alcohols with the aforementioned iodine numbers. The modifier should, in general, be largely free of multiple double bonds. The amount of modifier contained in the alkyd resin, generally lies in the range of about 40 to 70 weight percent for oil, fatty acids and/or fatty alcohols; 20 to 35 weight percent for dicarboxylic acids or isocyanates; and 5 to 15 weight percent for multifunctional alcohols.

Examples of natural and synthetic fatty acids or fatty alcohols suitable for use with the present invention are hexanoic acid, isooctanoic acid and the like or their hydrogenated derivatives (oxoalcohols). See Carstens, Lacquer Raw Material Tables, 1978, 46; Rompp's Chemie-Lexikon, 2nd Edition, 1103. It has been shown to be advantageous for the alkyd resins to have a corrected hydroxyl number (without the acid number) greater than 10 and preferably greater than 15. Alkyd resins with a hydroxyl number in the range of about 20 to about 35 have proven to be especially valuable. The acid number of the alkyd resins can also have an advantageous effect. For instance, alkyd resins with an acid number smaller than about 25, and especially one of about 6 to 12, are particularly valuable.

Contrary to previous technology wherein it was thought that alkyd resins with a viscosity as low as possible should be used for improving the pigment wetting properties, the inventively used, non-drying alkyd resins can have a viscosity in the range from 2000 dPa X sec (20° C.) up to the consistency of a solid resin.

Advantageously, the non-drying alkyd resins, contained in the inventive printing inks, have a weight average molecular weight ($M_w$) of from about 9000 to 30,000, and preferably of about 12,000 to about 22,000, or a number average molecular weight ($M_n$) of 3000 to 5000, preferably of about 3500 to about 4500. The dispersion factor usually lies in the range of 3 to 6, and preferably is from about 3.5 to 5. The molecular weight determinations can be carried out by means of gel permeation chromatography. Particularly valuable are those alkyd resins whose molecular weight $M_w$ is in the range of approximately 14,000 to 16,000 and whose molecular weight $M_n$ is in the range of about 3500 to 4000, corresponding to a dispersion factor of approximately 4.

When printing large editions in offset print shops, the inventive printing inks have the notable advantage of possessing considerable stability, for example, viscosity stability, which can be identified by inter alia the excellent point sharpness. Although the films produced with these printing inks show no crosslinking, they are tack-free and have entirely satisfactory adhesion, gloss and abrasion resistance. In addition, it is surprising that the printed sheets of paper lie flatter and tend to roll less than sheets printed with prior art inks. Moreover, they are free of unpleasant odors and do not tend to yellow. They can be printed over even after a longer period of time without any symptoms of the known ink acceptance disturbances (rejection effect). Finally, the inventive printing inks do not require the presence of environmentally questionable heavy metal driers.

The printing inks of the present invention can be used for lithoprinting, relief printing and, optionally, for rotogravure. The special advantages of the inventively obtained printing products are particularly evident with these processes. The improved liquor penetrating capability is of considerable advantage especially when printing labels. The improved deinking, even of products printed on imitation art paper and stored for a longer period of time, is of particular value. It is not clear as to what the good abrasion resistance on the one hand, and the ease of removal on the other hand, may be attributed. However, as a result of using the inventive, non-drying alkyd resins, it is not necessary to use the previously required drying alkyd resins, drying oils and driers. The inventive, non-drying alkyd resins therefore take the place of drying alkyd resins and drying oils. Small amounts of drying alkyd resins and drying oils can, however, be used. If, however, larger amounts of drying alkyd resins and drying oils are added, the inventively achieved advantages are increasingly destroyed.

A particularly preferred inventive object is the use of a printing ink, consisting of pigment, a non-drying alkyd resin, which is modified with oils, fatty acids and/or fatty alcohols with an iodine number less than 20. Optionally, components, such as, lubricants, solvents and viscosity modifiers conventionally used for the production of paper printings with recycling properties may be added. In this connection therefore, printing inks are used which are intended to be regenerated or are capable of being regenerated successfully with recovery of the paper. The removal of these printing inks by customary deinking processes leads to recycled paper of a high degree of whiteness.

Considerable advantages were also achieved by using the inventive printing inks for the preparation of transfer paper of heat transfer printing. A particular feature in this area of application is the fact that there is no change in the shade of the color during the storage of the transfer paper.

The following examples illustrate the present invention.

EXAMPLE 1

(a) In a multineck 5 l flask, equipped with stirrer, inert gas inlet, thermometer and water separator, 1800 g of coconut oil, 0.1 g of litharge and 569 g of trimethylolpropane are trans-esterified at 240° C. with stirring. Isophthalic acid (797 g), 250 ml of xylene and 7 g of p-toluenesulfonic acid as the esterification catalyst are then added and the reaction is continued with stirring at 245° C. to an acid number of ca. 8. Altogether, 173 g of reaction water are recovered, the remaining amount, as well as the carrier (xylene) being removed in the subsequent vacuum distillation. The resulting polyester has a viscosity of 4500 dPa X sec, a corrected hydroxyl number (without acid number) of 25 and an acid number of 8. In order to improve the handling of the product, the polyester is diluted with 600 g of mineral oil (boiling point range 250°–280° C.; 16% aromatics; an aniline point of 76° C. The viscosity then is ca. 320 dPa sec at 20° C.

(b) A benzidine yellow (10 g, color index: Pigment yellow 13) is ground together with 10 g of non-drying alkyd resin prepared as before, 2 g of a micronized polyethylene wax and 76 g of a binder solution consisting of 32 g of a phenol-modified resin in 44 g of mineral oil (boiling point range: 270°–310° C.; 18% aromatics and an aniline point of 72° C.) (viscosity of the binder solution: 120 dPa X sec at 20° C.).

(c) For comparison purposes, the non-drying alkyd resin was replaced by a conventional, commercial, drying alkyd resin based on soybean oil (isophthalic acid, trimethylol propane, 1500 dPa X sec, 20° C., 61% oil length), the composition otherwise being identical, 2 g of cobalt octoate being added for curing in conformity with conventional practice. For comparison purposes, the inventive printing ink (b) also received a corresponding addition.

(d) The inks were subjected to a printing comparison, the following results being obtained. The amount of printing ink applied in all cases was 1.5 g/m²±5%.

| Properties | Ink according to Example 1c (The invention) | Ink according to Example 1c (State of the Art) |
|---|---|---|
| Gloss Percent | 62 | 60 |
| Abrasion Resistance | very good | very good |
| Rate of Cure (Conter Test) | ca. 60 seconds | ca. 60 seconds |
| Odor Evolution During drying | none | distinct odor of rancid splitting products |
| Effect on the Taste of freshly ground chocolate (Robinson Test) | none | distinct |
| Liquor Penetration | 30 seconds | 160 seconds |
| Skin Formation on Can and Rollers | none | after ca. 4 hrs. |
| Yellowing | none | severe |

EXAMPLE 2

(a) As in Examples 1b and 1c, offset printing inks are prepared using the following formulation.

(b) Furnace soot (20 g) was ground together with 2 g of micronized polyethylene wax and 78 g of a binder consisting of 7 g of non-drying alkyd resin, prepared as described in Example 1a, 13 g of a phenol-modified, mineral-oil-soluble rosin, 10 g of a gilsonite asphalt and 48 g of mineral oil (boiling point range of 240°–260° C.; 16% aromatics; an aniline point of 77° C.), the binder components having been fused at 200° C. A well flowing and satisfactory offset printing ink resulted.

(c) Instead of the non-drying alkyd resin, the comparison formulation, corresponding to the state of the art, contained a drying isophthalic acid alkyd resin, the composition otherwise being the same.

(d) The inks were printed by rotary press printing on newsprint paper (52 g/m²), the printings were aged artificially for 5 days at 60° C. and then subjected to a standard deinking test. The brightness was determined by reflection measurement using an Elrepho photometer and a TAPPI filter No. 8.

| | Unprinted Paper | Paper Printed as Described in Example 2b | Paper Printed as Described in Example 2c |
|---|---|---|---|
| Brightness % (Elrepho) Reflection Values | 58.7 | 58.7 | 47.8 |

A comparison of brightness shows that the inventive printing ink (Example 2b) has outstanding stripping properties and that there is no impairment of the base paper, while the use of a conventional printing ink leads to clearly visible greying.

EXAMPLE 3

For the preparation of a transfer printing ink, 150 parts of Disperse Red 60, together with 50 parts of Disperse Blue 331 and 200 parts of the alkyd resin of Example 1a are ground in a three-roll mill together with 600 parts of a binder consisting of 250 parts of a phenol-modified rosin and 350 parts of mineral oil (boiling point range: 270° C. to 310° C.; 18% aromatics and an aniline point of 72° C.). The resulting transfer printing ink was printed at a thickness of 1.5 g/m² and heat-transferred by ironing immediately after the printing and after various periods of aging. Changes in shade could not be detected.

As in the previous example, the non-crosslinking alkyd resin was exchanged for an alkyd resin based on linseed oil and isophthalic acid. For comparison purposes, 10 parts of a cobalt drier were added in each case. The preparation of the printing samples was also similar. In the similarly carried out heat-transfer tests, a distinct change in shade was observed already after a 4 hour aging of the printing. This change in shade became more pronounced with increasing length of storage of the transfer paper.

EXAMPLE 4

In a multineck flask of 1 l capacity, equipped with stirrer, inert gas inlet, thermometer, Dimroth condenser and calibrated dropping funnel, 287.8 g of refined coconut oil, together with 0.02 g of litharge and 91 g of trimethylol propane were transesterified at 240° C. with stirring. The reaction product was subsequently cooled to room temperature and 168.7 g of isophorone diisocyanate were slowly added from a calibrated dropping funnel, while stirring in the presence of 0.3 g of dibutyl tin dilaurate. The exothermic reaction was continued until the titrimetrically determined NCO content was less than 0.5%. The residual isocyanate was decomposed by the addition of 2 g of ethanol. The resulting non-drying urethane alkyd had a viscosity of 230,000 dPa X sec at 20° C., a corrected OH number of 40 and an acid number of 2. In order to improve the handling of the product, the batch was added to 235 g of mineral oil (boiling point range: 270°–310° C.; 18% aromatics; aniline point: 72° C.). The viscosity of the product then was ca. 3000 dPa X sec at 20° C.

Comparably carried out grindings of the printing ink showed similar application properties as the ink of Example 1c.

We claim:

1. In a method for printing paper wherein ink is applied to paper using the offset printing process, the improvement which comprises said ink being composed of pigment, an alkyd resin binder, wherein the alkyd resin is non-drying and has a weight average molecular weight ($M_w$) of from 12,000 to 22,000 and is modified with oils, fatty acids or fatty alcohols with an iodine number less than about 20 and additional conventional additives.

2. The method of claim 1 wherein the alkyd resin is modified with coconut oil.

3. The method of claim 1 or 2 wherein the alkyd resin has a corrected OH number greater than about 10.

4. The method of claim 1 or 2 wherein the alkyd resin has a corrected OH number greater than about 15.

5. The method of claim 1 or 2 wherein the alkyd resin has a corrected OH number in the range from about 20 to 35.

6. The method of claim 1 or 2 wherein the non-drying alkyd resin has a viscosity in the range from 2000 dPa X sec (20° C.) to the consistency of a solid resin.

7. The method of claim 1 or 2 wherein the alkyd resin has an acid number less than about 25.

8. The method of claim 1 or 2 wherein the alkyd resin has an acid number from about 6 to 12.

9. The method of claim 1 or 2 wherein the alkyd resin has a weight average molecular weight ($M_w$) of from 9000 to 30,000.

10. The method of claim 1 or 2 wherein the alkyd resin has a number average molecular weight ($M_n$) of 3000 to 5000.

11. The method of claim 1 or 2 wherein the alkyd resin has a number average molecular weight ($M_n$) of about 3500 to 4500.

12. The method of claim 1 or 2 wherein the alkyd resin as a dispersion factor ($M_w/M_n$) of from 3 to 6.

13. The method of claim 1 or 2 wherein the alkyd resin has a dispersion factor ($M_w/M_n$) of from 3.5 to 5.

14. The method of claim 1 or 2 wherein the amount of modifier in the alkyd resin is in the range from about 40 to 70 weight percent.

* * * * *